Figure 1:
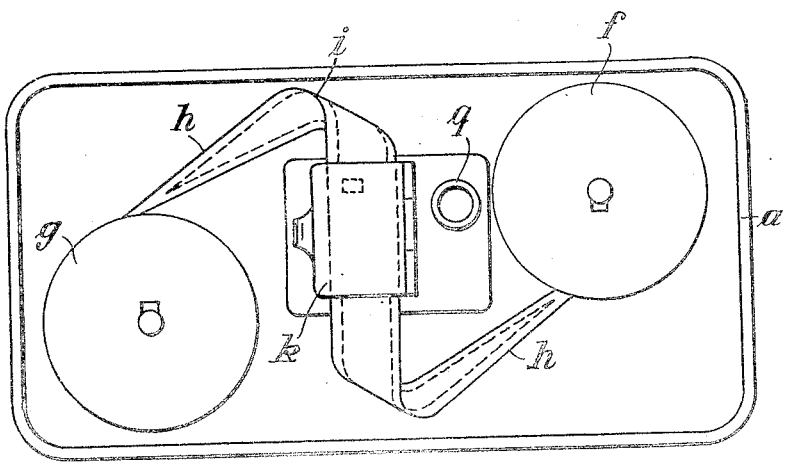

Dec. 22, 1942.   R. RÜHNAU   2,305,813
CINEMATOGRAPH CAMERA
Filed June 28, 1939.

Inventor
Richard Ruhnau
By Owen & Owen
Attorneys

Patented Dec. 22, 1942

2,305,813

UNITED STATES PATENT OFFICE 2,305,813

CINEMATOGRAPH CAMERA

Richard Ruhnau, Berlin-Tempelhof, Germany; vested in the Alien Property Custodian Application June 28, 1939, Serial No. 281,676
In Germany June 2, 1938

3 Claims. (Cl. 88—17)

This invention relates to a cinematograph camera more especially for substandard film and has for its purpose improvements of the known cameras of this kind. In these known cinematograph cameras the film spools, lens and so forth are so arranged relatively to one another that the camera must necessarily be used in a vertical position. The disadvantage has been experienced that the person using the camera is scarcely ever able to hold it exactly vertical because owing to the small surfaces or edges of comparison it is scarcely possible to check whether the camera is in the correct position, so that frequently the photographs are not perfectly satisfactory.

By means of the invention these disadvantages are obviated and a camera is produced which has a casing of elongated form which extends horizontally and at right angles to the optical axis. This is a big advantage in consideration of the fact that the user can judge whether a camera is being held horizontal, if it has a long horizontal edge, much better than he can judge the verticality of a high, narrow camera. This construction is made possible by a new arrangement of the interior parts of the camera in relation to each other, viz. by contrary to the arrangements hitherto known arranging the film spools on the both sides of the objective and in such a manner that their axes are parallel or approximately parallel to the optical axis. The spools, the lens and the film-feeding mechanism with the gate and the driving means are mounted on a plate arranged in the casing which subdivides the casing perpendicular to the optical axis. By means of this advantage is obtained that all important parts of the camera are attached to the plate and may be adjusted in their position relatively to one another before the plate is inserted in the casing. The space between the plate and the rear wall of the casing, which contains, apart from the film guiding mechanism, only the two film spools, is shut off in a completely light-tight manner, for example by means of appropriate packing at the joints.

In order to obtain a camera shape which is as compact as possible, and in particular in order to avoid any projecting parts, the lens is preferably sunk in the casing between the two film spools.

The film-guiding device is advantageously so constructed that the film is twisted before and after running through the gate, each time forming a 90° loop, whereby in the very narrow space between the film spool and the gate, parts of the film may be accommodated which, utilising the elasticity of the film, replace pre-winding and after-winding devices.

The drive of the winding-on spool and of the film-feed mechanism is effected through suitable driving means in the known manner by means of a spring mechanism or an electric motor which is fed from a battery.

An embodiment of the camera according to the invention for 8 millimetre substandard film is shown in the accompanying drawing in which—

Figure 2:
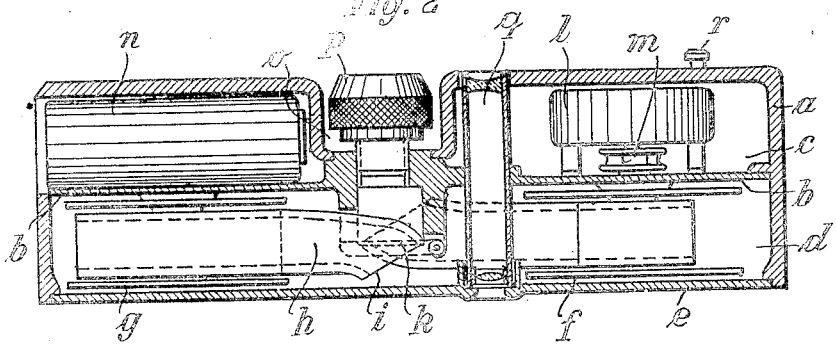

Figure 1 is an elevation of the casing with the rear wall of the casing omitted, and Figure 2 a plan in section.

In the casing $a$ a plate $b$ is arranged in such a manner that the casing $a$ is divided into two almost equal chambers $c$ and $d$. The casing $a$ is shut off on its rear side by the cover $e$. The two film spools $f$ and $g$ are so arranged on the plate $b$ in the light-tight chamber $d$ that their axes run parallel to one another. The film $h$, after leaving the winding-off spool $g$, forms a loop and at the same time a twist through 90° at $i$ before passing through the gate $k$ whereat, after forming a similar loop and twist, it is wound on to the winding-on spool $f$. The rear wall of the gate is arranged so that it swings open, whereby the insertion of the film is very greatly facilitated.

In the chamber $c$ there is arranged on the plate $b$ an electric motor $l$ which, by means of a belt and a grooved pulley $m$, drives the winding-on spool. The motor $l$ is fed by a battery $n$ which is also arranged in the chamber $c$. Furthermore, the film feeding mechanism, which is not illustrated in the drawing, is driven through suitable transmitting members (also not illustrated) by the electric motor $l$. The casing $a$ has a recess at $o$ in which the lens $p$ which is attached to the plate is arranged sunk in the casing $a$. The recess $o$ is of such shape that the iris diaphragm and if desired the focus of the lens, may be readily adjusted by hand. There is also provided a viewfinder $q$ which extends through the plate $b$ at the side of the lens $p$. In order to start the camera there is arranged at a readily accessible place on the front side of the casing $a$ a button $r$ which engages and disengages the motor $l$ and the film-feeding mechanism. A slipping clutch controlled by centrifugal force may be provided to delay the starting of the film-feeding mechanism until the motor is running at full speed.

The invention is not restricted to the modifications described and represented in the drawing, but may be varied in many ways without departing from its fundamental idea.

Having now particularly described and ascertained the nature of my invention and in what manner the same is to be performed, I declare that what I claim is:

1. A cinematograph camera including a horizontally elongated casing having an open back, and having a depressed lens-receiving portion in its front, said depressed portion having an opening in its bottom and the front of the casing having an opening to one side of the depressed portion, a plate insertible in the casing through the back thereof, and dividing the casing into front and rear compartments, a battery, a motor and film spools carried by the plate, a lens carried by the plate and insertible through the opening in the bottom of the depressed portion, a gate carried by the plate, a view finder carried by the plate and receivable in the opening to one side of the depressed portion of the front of the casing, and a removable cover for the open back of the casing having an opening in registry with the rear end of the view finder, whereby said battery, motor, film spools, lens, gate, and view finder, together with the plate, constitute a unit, which latter is insertible from the back of the casing.

2. A camera including a casing, a lens, means mounting said lens in a wall of said casing for transmitting light therethrough along one axis, a film gate, means mounting said film gate in said casing behind said lens for supporting film in a plane normal to said one axis, guide means on said film gate for guiding film therethrough in one direction, said guide means being of greater length than the width of said film, a pair of film spools, one of said spools constituting a supply spool, the other of said spools constituting a wind-on spool, means for driving said wind-on spool, means mounting said film spools in said casing at each side, respectively, of said film gate for rotation about second and third axes substantially parallel with said one axis for feeding film through said guide means so that the surface of the film on said spools lies in a plane transverse to the film in said guide means whereby a free twist is formed in the film between each of said spools and said guide means, the supply and wind-on spools being mounted above and below, respectively, the entrance and exit of said film gate so that film passing directly from said supply spool to said guide means and from said guide means to said wind-on spool forms free loops at the 90° twists whereby, when said wind-on spool is driven, the elastic resistance of said film against bending from said one direction, as said film moves across said gate, guides said film through said loops and twists, an element formed of a unitary piece of material for mounting said lens and film gate and carrying said film spools, said element forming a light-tight partition removably engaged across said casing and having a forwardly extending central portion engaging into a central opening in a wall of said casing and mounting a lens tube, and said element further having a rearwardly extending central portion forming a gate aperture and carrying said guide means thereon behind said lens tube.

3. A camera including a casing, a lens, means mounting said lens in a wall of said casing for transmitting light therethrough along one axis, a film gate, means mounting said film gate in said casing behind said lens for supporting film in a plane normal to said one axis, guide means on said film gate for guiding film therethrough in one direction, said guide means being of greater length than the width of said film, a pair of film spools, one of said spools constituting a supply spool, the other of said spools constituting a wind-on spool, means for driving said wind-on spool, means mounting said film spools in said casing at each side, respectively, of said film gate for rotation about second and third axes substantially parallel with said one axis for feeding film through said guide means so that the surface of the film on said spools lies in a plane transverse to the film in said guide means whereby a free twist is formed in the film between each of said spools and said guide means, the supply and wind-on spools being mounted above and below, respectively, the entrance and exit of said film gate so that film passing directly from said supply spool to said guide means and from said guide means to said wind-on spool forms free loops at the 90° twists whereby, when said wind-on spool is driven, the elastic resistance of said film against bending from said one direction, as said film moves across said gate, guides said film through said loops and twists, an element formed of a unitary piece of material for mounting said lens and film gate and carrying said film spools, said element forming a light-tight partition removably engaged across said casing and having a forwardly extending central portion engaging into a central opening in a wall of said casing and mounting a lens tube, and said element further having a rearwardly extending central portion forming a gate aperture and carrying said guide means thereon behind said lens tube, and a view finder comprising a tube affixed in said casing and registering with apertures in the front and rear walls thereof and removably engaged at its front and rear ends, respectively, with said walls.

RICHARD RUEHNAU.